(12) United States Patent
Gallup et al.

(10) Patent No.: US 9,046,996 B2
(45) Date of Patent: Jun. 2, 2015

(54) TECHNIQUES FOR NAVIGATION AMONG MULTIPLE IMAGES

(71) Applicant: Google Inc., Mountain View, CA (US)

(72) Inventors: David Gallup, Bothell, WA (US); Liyong Chen, Beijing (CN); Shuchang Zhou, Beijing (CN); Steven Maxwell Seitz, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/056,527

(22) Filed: Oct. 17, 2013

(65) Prior Publication Data

US 2015/0113474 A1      Apr. 23, 2015

(51) Int. Cl.
*G09G 5/10*        (2006.01)
*G06F 3/0485*      (2013.01)

(52) U.S. Cl.
CPC .................................. *G06F 3/0485* (2013.01)

(58) Field of Classification Search
CPC ....... G06T 3/60–3/608; G06F 3/0484–3/0486; G06F 3/04815
See application file for complete search history.

(56) References Cited

U.S. PATENT DOCUMENTS

| | | | |
|---|---|---|---|
| 5,247,356 A | 9/1993 | Ciampa | |
| 6,314,370 B1 | 11/2001 | Curtright | |
| 7,197,170 B2 | 3/2007 | Dwyer et al. | |
| 7,466,244 B2 | 12/2008 | Kimchi et al. | |
| 7,734,116 B2 | 6/2010 | Panabaker et al. | |
| 7,777,648 B2 | 8/2010 | Smith et al. | |
| 7,778,491 B2 | 8/2010 | Steedly et al. | |
| 7,889,948 B2 | 2/2011 | Steedly et al. | |
| 7,920,072 B2 | 4/2011 | Smith et al. | |
| 8,159,524 B2 | 4/2012 | Wilson et al. | |
| 8,160,400 B2 | 4/2012 | Snavely et al. | |
| 8,350,850 B2 | 1/2013 | Steedly et al. | |
| 8,514,266 B2 | 8/2013 | Wilson et al. | |
| 8,593,518 B2 | 11/2013 | Schultz et al. | |
| 2003/0014224 A1 | 1/2003 | Guo et al. | |
| 2003/0110185 A1 | 6/2003 | Rhoads | |
| 2003/0158655 A1 | 8/2003 | Obradovich et al. | |
| 2006/0098010 A1 | 5/2006 | Dwyer et al. | |
| 2006/0195475 A1 | 8/2006 | Logan et al. | |
| 2006/0238379 A1 | 10/2006 | Kimchi et al. | |
| 2006/0238380 A1 | 10/2006 | Kimchi et al. | |
| 2006/0238381 A1 | 10/2006 | Kimchi et al. | |

(Continued)

FOREIGN PATENT DOCUMENTS

CA        2843772 A1        2/2013

OTHER PUBLICATIONS

"Photo Tourism Exploring Photo Collections in 3D" [online], Retrieved Jul. 25, 2013, <phototour.cs.washington.edu>, 2 pages.
Avanish Kushal, Ben Self, Yasutaka Furukawa, David Gallup, Carlos Hernandez, Brian Curless and Steven M. Seitz, Photo Tours, 2012, 8 pages.

(Continued)

*Primary Examiner* — David H Chu
(74) *Attorney, Agent, or Firm* — Lerner, David, Littenberg, Krumholz & Mentlik, LLP

(57) ABSTRACT

Aspects of the disclosure relate generally to providing a user with an image navigation experience. In order to do so, a reference image may be identified. A set of potential target images for the reference image may also be identified. A drag vector for user input relative to the reference image is determined. For particular image of the set of target images an associated cost is determined based at least in part on a cost function and the drag vector. A target image is selected based on the determined associated costs.

20 Claims, 12 Drawing Sheets

TARGET IMAGES FOR REFERENCE IMAGE 1

| | PAN MOTION | SLIDE MOTION | ORBIT MOTION |
|---|---|---|---|
| Drag Vector 1 | Target Image 1 | Target Image 1 | Target Image 1 |
| Drag Vector 2 | Target Image 1 | Target Image 2 | Target Image 2 |
| Drag Vector 3 | Target Image 2 | Target Image 3 | Target Image 4 |
| Drag Vector 4 | Target Image 3 | Target Image 5 | Target Image 5 |
| Drag Vector 5 | | | |

(56) References Cited

U.S. PATENT DOCUMENTS

| | | | |
|---|---|---|---|
| 2006/0238382 A1 | 10/2006 | Kimchi et al. | |
| 2006/0238383 A1 | 10/2006 | Kimchi et al. | |
| 2006/0241859 A1 | 10/2006 | Kimchi et al. | |
| 2006/0241860 A1 | 10/2006 | Kimchi et al. | |
| 2007/0024612 A1 | 2/2007 | Balfour | |
| 2007/0110338 A1 | 5/2007 | Snavely et al. | |
| 2007/0201752 A1 | 8/2007 | Gormish et al. | |
| 2007/0210937 A1 | 9/2007 | Smith et al. | |
| 2007/0237420 A1 | 10/2007 | Steedly et al. | |
| 2007/0265781 A1 | 11/2007 | Nemethy et al. | |
| 2007/0273558 A1 | 11/2007 | Smith et al. | |
| 2008/0027985 A1 | 1/2008 | Kasperkiewicz et al. | |
| 2008/0028341 A1 | 1/2008 | Szeliski et al. | |
| 2008/0069480 A1* | 3/2008 | Aarabi et al. | 382/305 |
| 2008/0221843 A1 | 9/2008 | Shenkar et al. | |
| 2008/0231700 A1 | 9/2008 | Schultz et al. | |
| 2009/0073191 A1 | 3/2009 | Smith et al. | |
| 2009/0092277 A1 | 4/2009 | Ofek et al. | |
| 2009/0327024 A1 | 12/2009 | Nielsen et al. | |
| 2010/0079501 A1* | 4/2010 | Ikeda et al. | 345/661 |
| 2010/0085350 A1 | 4/2010 | Mishra et al. | |
| 2010/0118025 A1 | 5/2010 | Smith et al. | |
| 2010/0232770 A1* | 9/2010 | Prestenback et al. | 386/126 |
| 2010/0238164 A1 | 9/2010 | Steedly et al. | |
| 2010/0289826 A1* | 11/2010 | Park et al. | 345/676 |
| 2010/0295971 A1 | 11/2010 | Zhu | |
| 2010/0309167 A1* | 12/2010 | Nam | 345/174 |
| 2011/0090337 A1 | 4/2011 | Klomp et al. | |
| 2011/0091076 A1 | 4/2011 | Schultz et al. | |
| 2011/0212717 A1 | 9/2011 | Rhoads et al. | |
| 2011/0244919 A1 | 10/2011 | Aller et al. | |
| 2011/0310088 A1 | 12/2011 | Adabala et al. | |
| 2011/0312374 A1 | 12/2011 | Chen et al. | |
| 2012/0072863 A1* | 3/2012 | Akifusa | 715/784 |
| 2012/0263397 A1 | 10/2012 | Kimura | |
| 2012/0301039 A1 | 11/2012 | Maunder et al. | |
| 2013/0104076 A1 | 4/2013 | Cristescu et al. | |
| 2013/0321290 A1* | 12/2013 | Oh et al. | 345/173 |

OTHER PUBLICATIONS

Bing Maps Tile System, http://msdn.microsoft.com/en-us/library/bb259689(v=MSDN.10).aspx, retrieved from the Internet on Apr. 5, 2010, 13 pages.

Importing and Mapping Data, http://msdn.microsoft.com/en-us/library/bb259689(v=MSDN.10).aspx, retrieved from the Internet on Apr. 5, 2010, 17 pages.

Noah Snavely, Rahul Garg, Steven M. Seitz, and Richard Szeliski, Finding Paths Through the Worlds's Photos, 2008, 11 pages.

Noah Snavely, Steven M. Seitz, and Richard Szeliski, "Photo Tourism: Exploring Photo Collections in 3D" Power Point presentation, 2006, 79 pages.

Working with 3D, http://msdn.microsoft.com/en-us/library/cc451896(v=MSDN.10).aspx, retrieved from the Internet on Apr. 5, 2010, 17 pages.

Toyama, K. et al., "Geographic Location Tags on Digital Images," Proceeding Multimedia '03 Proceedings of the eleventh ACM International Conference on Multimedia, pp. 156-166.

Microsoft, Inc., "What is Photosynth?—About—Photosynth," http://photosynth.net/about.aspx, p. 1-2.

Woldberg, George, "Geometrick Transformation Techniques for Digital Images: A Survey." (1988).

Microsoft Inc., "FAQ", Microsoft Photosynth, <http://photosynth.net/faq.aspx>, printed on Aug. 21, 2014.

Microsoft Inc., "How Does it Work?", Microsoft Photosynth, <http://photosynth.net/Background.aspx>, printed on Aug. 21, 2014.

Microsoft Inc., "Mobile Panoramas", Microsoft Photosynth, <http://photosynth.net/mobile.aspx>, printed on Aug. 21, 2014.

Microsoft Inc., "Photosynth Help", Microsoft Photosynth, <http://photosynth.net/help.aspx>, printed on Aug. 21, 2014.

Microsoft Inc., "Publishing Panoramas to Photpsynth", Microsoft Photosynth, <http://photosynth.net/ice.aspx>, printed on Aug. 21, 2014.

International Search Report and Written Opinion for Application No. PCT/US2014/055986 dated Dec. 18, 2014.

* cited by examiner

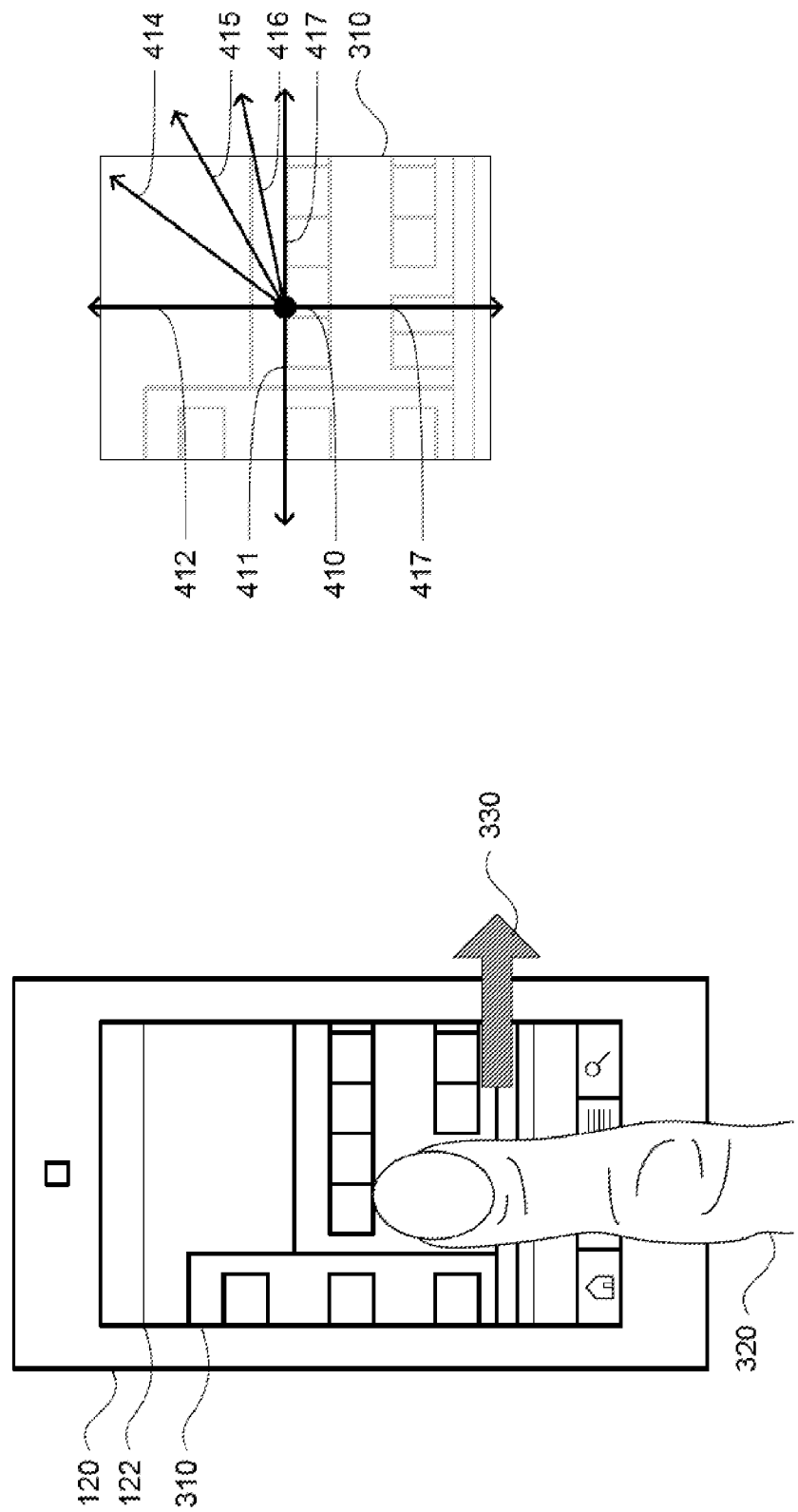

Example Table of Weight Values

|            | pan | slide | pan + slide | orbit (cw) | orbit (ccw) |
|------------|-----|-------|-------------|------------|-------------|
| w_flow     | 1   | 1     | 1           | 0          | 0           |
| w_rot      | 1   | 0     | 0           | 0          | 1           |
| w_op_rot   | 0   | 0     | 0           | 1          | 0           |
| w_no_rot   | 0   | 1     | 0           | 0          | 0           |
| w_trans    | 0   | 1     | 0           | 1          | 0           |
| w_op_trans | 0   | 0     | 0           | 0          | 1           |
| w_no_trans | 1   | 0     | 0           | 0          | 0           |

FIGURE 10

TARGET IMAGES FOR REFERENCE IMAGE 1

|  | PAN MOTION | SLIDE MOTION | ORBIT MOTION |
|---|---|---|---|
| Drag Vector 1 | Target Image 1 | Target Image 1 | Target Image 1 |
| Drag Vector 2 | Target Image 1 | Target Image 2 | Target Image 2 |
| Drag Vector 3 | Target Image 2 | Target Image 3 | Target Image 4 |
| Drag Vector 4 | Target Image 3 | Target Image 5 | Target Image 5 |
| Drag Vector 5 | | | |

TECHNIQUES FOR NAVIGATION AMONG MULTIPLE IMAGES

BACKGROUND

Various systems allow users to view images in sequences, such as in time or space. In some examples, these systems can provide a navigation experience in a remote or interesting location. Some systems allow users to feel as if they are rotating within a virtual world by clicking on the edges of a displayed portion of a panorama and having the panorama appear to "move" in the direction of the clicked edge.

SUMMARY

One aspect of the disclosure provides a computer-implemented method. The method includes identifying, by one or more computing devices, a reference image; identifying, by the one or more computing devices, a set of potential target images for the reference image; determining, by the one or more computing devices, a drag vector for user input relative to the reference image; for each particular potential target image of the set of potential target images, determining, by the one or more computing devices, an associated cost based at least in part on a cost function and the drag vector; and selecting, by the one or more computing devices, a target image from the set of potential target images based on the determined associated costs.

In one example, the method also includes providing the selected target image for display to a user. In another example, the cost function is determined as a weighted sum of one or more cost terms. In another example, selecting the target image includes selecting the particular potential target image of the set of potential target images having a lowest-valued associated cost. In another example, determining the associated cost for each particular potential target image of the set of potential target images includes determining a drag flow cost term between the reference image and that particular potential target image, and the drag flow cost term is configured to be minimized when an observed flow of points of the reference image to that particular potential target image is equal to the drag vector. In another example, determining the associated cost for each particular target image of the set of potential target images includes determining a rotation cost term between the reference image and that particular potential target image, and the rotation cost term is configured to be minimized when a rotation component of an observed flow of points of the reference image to that particular potential target image is equal to the drag vector. In another example, determining the associated cost for each particular potential target image of the set of potential target images includes determining a rotation cost term between the reference image and that particular potential target image, and the rotation cost term is configured to be minimized when a rotation component of an observed flow of points of the reference image to that particular potential target image is opposite of the drag vector. In another example, determining the associated cost for each particular potential target image of the set of potential target images includes determining a rotation cost term between the reference image and that particular potential target image, and the rotation cost term is configured to be minimized when a rotation component of an observed flow of points of the reference image to that particular potential target image is zero. In another example, determining the associated cost for each particular potential target image of the set of potential target images includes determining a translation cost term between the reference image and that particular potential target image, and the translation cost term is configured to be minimized when a translation component of an observed flow of points of the reference image to that particular potential target image is equal to the drag vector. In another example, determining the associated cost for each particular potential target image of the set of potential target images includes determining a translation cost term between the reference image and that particular potential target image, and the drag flow cost term is configured to be minimized when a translation component of an observed flow of points of the reference image to that particular potential target image is opposite of the drag vector. In another example, determining associated cost for each particular potential target image of the set of potential target images includes determining a translation cost term between the reference image and that particular potential target image, and the drag flow cost term is configured to be minimized when a translation component of an observed flow of points of the reference image to that particular potential target image is zero. In another example, determining the associated cost for each particular potential target image of the set of target images includes determining an overlap cost term based on an amount of overlap of points between the reference image and that particular potential target image. In another example, determining the associated cost further includes determining weights for one or more terms of the cost function based on a particular motion result, and the motion result is selected from the group consisting of a panning motion, a sliding motion, and an orbiting motion. In another example, the method also includes receiving, from a client computing device, a request for a target image, the request identifying the drag vector and the reference image; retrieving the selected target image based on the association with the drag vector and the reference image; and providing the selected target image to the client computing device.

Another aspect of the disclosure provides a system comprising one or more computing devices. The one or more computing devices are configured to identify a reference image; identify a set of potential target images for the reference image; determine a drag vector for user input relative to the reference image; for each particular potential target image of the set of potential target images, determine an associated cost based at least in part on a cost function and the drag vector; and select a target image based on the determined associated costs.

In one example, the one or more computing devices are configured to determine the cost functions as weighted sum of one or more cost terms. In another example, the one or more computing devices are configured to select the target image by selecting the particular potential target image of the set of potential target images having a lowest-valued associated cost. In another example, the one or more computing devices are configured to determine the associated cost for each particular potential target image of the set of potential target images by determining a drag flow cost term between the reference image and that particular potential target image, and the drag flow cost term is configured to be minimized when an observed flow of points of the reference image to that particular potential target image is equal to the drag vector. In another example, the one or more computing devices are configured to determine the associated cost for each particular target image of the set of potential target images by determining a rotation cost term between the reference image, and that particular potential target image and wherein the rotation cost term is configured to be minimized when a rotation component of an observed flow of points of the reference image to that particular potential target image is equal to the drag vector. In another example, the one or more computing devices are configured to determine the associated cost for each particular potential target image of the set of potential target images by determining a rotation cost term between the reference image and that particular potential target image, and the rotation cost term is configured to be minimized when a rotation component of an observed flow of points of the reference image to that particular potential target image is opposite of the drag vector. In another example, the one or more computing devices are configured to determine the associated cost for each particular potential target image of the set of potential target images by determining a rotation cost term between the reference image and that particular potential target image, and the rotation cost term is configured to be minimized when a rotation component of an observed flow of points of the reference image to that particular potential target image is zero. In another example, the one or more computing devices are configured to determine the associated cost for each particular potential target image of the set of potential target images by determining a translation cost term between the reference image, and that particular potential target image and wherein the translation cost term is configured to be minimized when a translation component of an observed flow of points of the reference image to that particular potential target image is equal to the drag vector. In another example, the one or more computing devices are configured to determine the associated cost for each particular potential target image of the set of potential target images by determining a translation cost term between the reference image and that particular potential target image, and the drag flow cost term is configured to be minimized when a translation component of an observed flow of points of the reference image to that particular potential target image is opposite of the drag vector. In another example, the one or more computing devices are configured to determine the associated cost for each particular potential target image of the set of potential target images by determining a translation cost term between the reference image and that particular potential target image, and the drag flow cost term is configured to be minimized when a translation component of an observed flow of points of the reference image to that particular potential target image is zero. In another example, the one or more computing devices are configured to determine the associated cost for each particular potential target image of the set of target images by determining an overlap cost term based on an amount of overlap of points between the reference image and that particular potential target image. In another example, the one or more computing devices are configured to determine the associated cost further by determining weights for one or more terms of the cost function based on a particular motion result, and the motion result is selected from the group consisting of a panning motion, a sliding motion, and an orbiting motion. In another example, the one or more computing devices are configured to receive, from a client computing device, a request for a target image, the request identifying the drag vector and the reference image; retrieve the selected target image based on the association with the drag vector and the reference image; and provide the selected target image to the client computing device. In another example, the one or more computing devices are also configured to provide the selected target image for display to a user.

A further aspect of the disclosure provides a non-transitory, computer-readable storage device on which computer readable instructions of a program are stored. The instructions, when executed by one or more processors, cause the one or more processors to perform a method. The method includes identifying, by one or more computing devices, a reference image; identifying, by the one or more computing devices, a set of potential target images for the reference image; determining, by the one or more computing devices, a drag vector for user input relative to the reference image; for each particular potential target image of the set of potential target images, determining, by the one or more computing devices, an associated cost based at least in part on a cost function and the drag vector; and selecting, by the one or more computing devices, a target image from the set of potential target images based on the determined associated costs.

BRIEF DESCRIPTION OF THE DRAWINGS

FIG. 3 is an example of a client computing device and user input in accordance with aspects of the disclosure.

FIG. 4 is an example screen shot on a client computing device in accordance with aspects of the disclosure.

FIG. 10 is a table of example weight values in accordance with aspects of the disclosure.

FIG. 11 is another example of image data in accordance with aspects of the disclosure.

DETAILED DESCRIPTION

Overview

Figure 1:
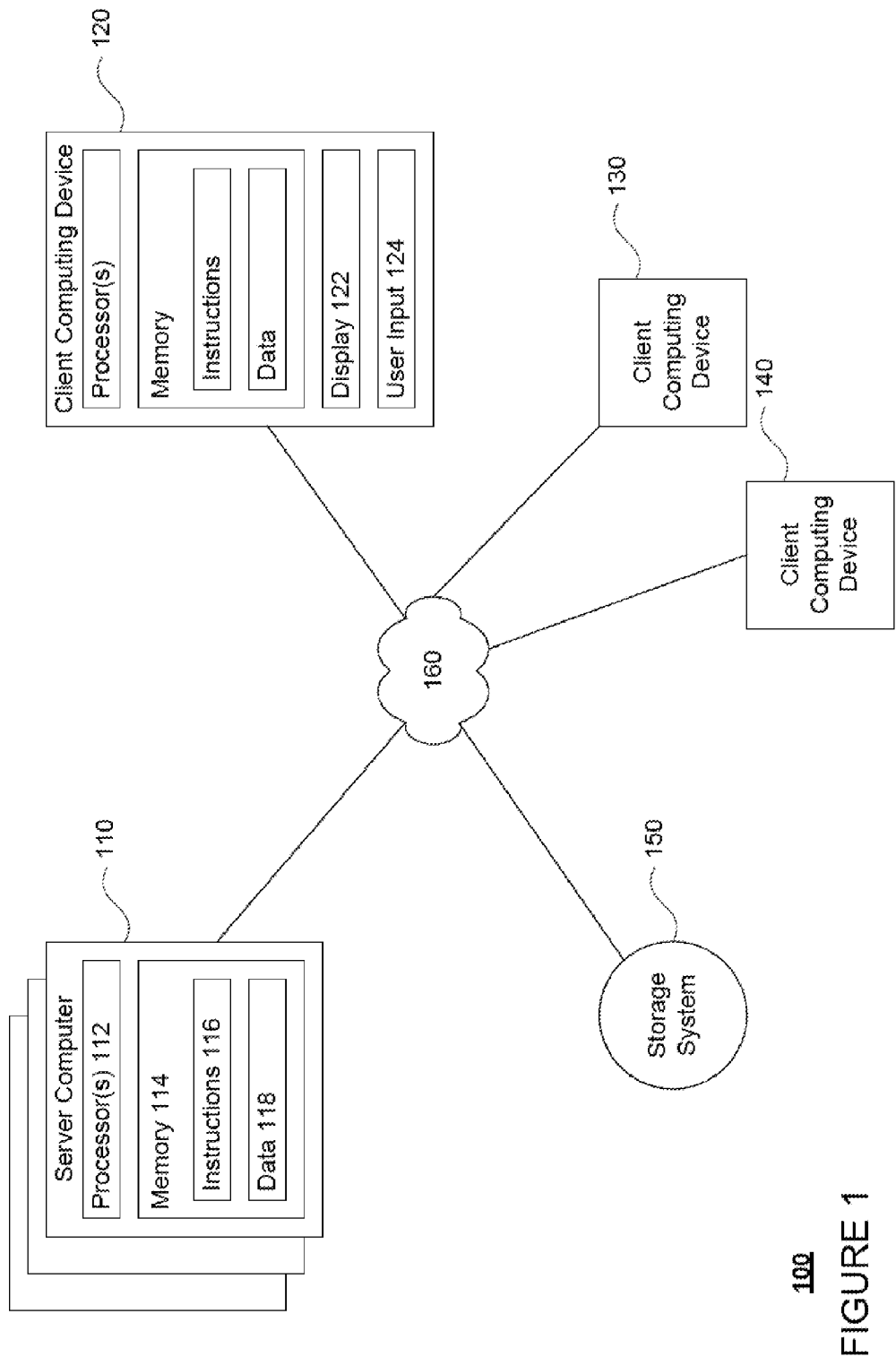
FIG. 1 is a functional diagram of an example system in accordance with aspects of the disclosure.

Aspects of the technology relate to providing photo navigation experiences to users and determining the best view (image) of a location in response to a user input gesture, in particular a dragging motion. For example, a user may view a reference image on a display of a client device. In order to navigate to other images at or near the same location as the reference image, the user may perform a dragging motion on the reference image using a mouse, touch screen, or other user input device. In response, the user may be provided with a target image that best relates to the reference image and the user's dragging motion. For example, a user may navigate through a virtual tour by dragging an area of a first image and receiving a second image that is related in time or space to that first image. This may provide the user with the feeling of dragging a point in one image into another image.

In some examples, each reference image may be preprocessed to determine the best target image for each of a plurality of different drag vectors for that image. A drag vector may define an origin and a direction of the user's dragging motion relative to a reference image.

In order to select the target image, for each particular drag vector, a cost function may be evaluated for each possible target image. In order to evaluate the cost functions, each of the reference and potential target images may be associated with a depth map and the relative pose (location and orientation) of the camera that captured the image. The depth map and relative pose may be generated using 3D reconstruction. In this regard, the depth map provides a 3D location mapping of each pixel in an image. Thus, an initial set of potential target images for a particular image may be determined based on the location and, in some examples, orientation information for both the reference image and the potential target images.

The cost function may include various cost terms. These cost terms may be related to the flow fields, of the translational and rotational "flow" of pixels between the reference image and the target image. Example cost terms may include the following. A drag flow cost that is minimized when the actual observed flow between the reference image and the target is equal to the drag. A rotation cost that is minimized when the rotation flow is equal to the drag vector. An opposite rotation cost that is minimized when the flow due to rotation is opposite of the drag vector. A non-rotation cost that is minimized when the flow due to rotation is zero. A translation cost that is minimized when the flow due to translation is equal to the drag vector. An opposite translation cost that is minimized when the flow due to translation is the opposite of the drag vector. A non-translation cost that is minimized when the flow due to translation is zero.

Other cost terms which are not based on flow, such as an overlap cost, may also be used. In one example, the target image should overlap with the reference image as much as possible. Thus, the overlap cost may include two cost values: (1) how much of the reference image overlaps with the target image and (2) how much of the target image overlaps with the reference image. As overlap increases, the overlap cost may decrease. Thus, this cost value may be an inverted value.

The cost function may be set up to favor a particular result by changing the weighted values. For example, when a user uses an input device (such as a mouse or touch screen) to drag an image, the user may be provided with one of three different types of results: a pan or tilt where the target image gives the user the feeling of moving closer to an object in the reference image, a slide where the target image gives the user the feeling of sliding adjacent to an object in the reference image, or an orbit where the target image gives the user the feeling of moving around an object in the reference image. In the pan/tilt example, the drag flow is expected to match the drag vector, and the translation flow is expected to match the zero vector. In the slide example, both the drag flow and the translation flow are expected to match the drag vector. And in the orbit example, the flow close to the center of the image is expected to match the zero vector.

The cost functions for each target image of the set of target images may be determined for each particular result type. Accordingly, selected target image for each of the different drag vectors and result types may be associated with the reference image. As noted above, the target image data may be used to provide target images to users in response to a dragging input on a reference image. In one example, before a user drags the reference image, the user may select a particular result type. The result type designated by the user may be used to retrieve a target image in response to the dragging input.

Example Systems

Figure 2:
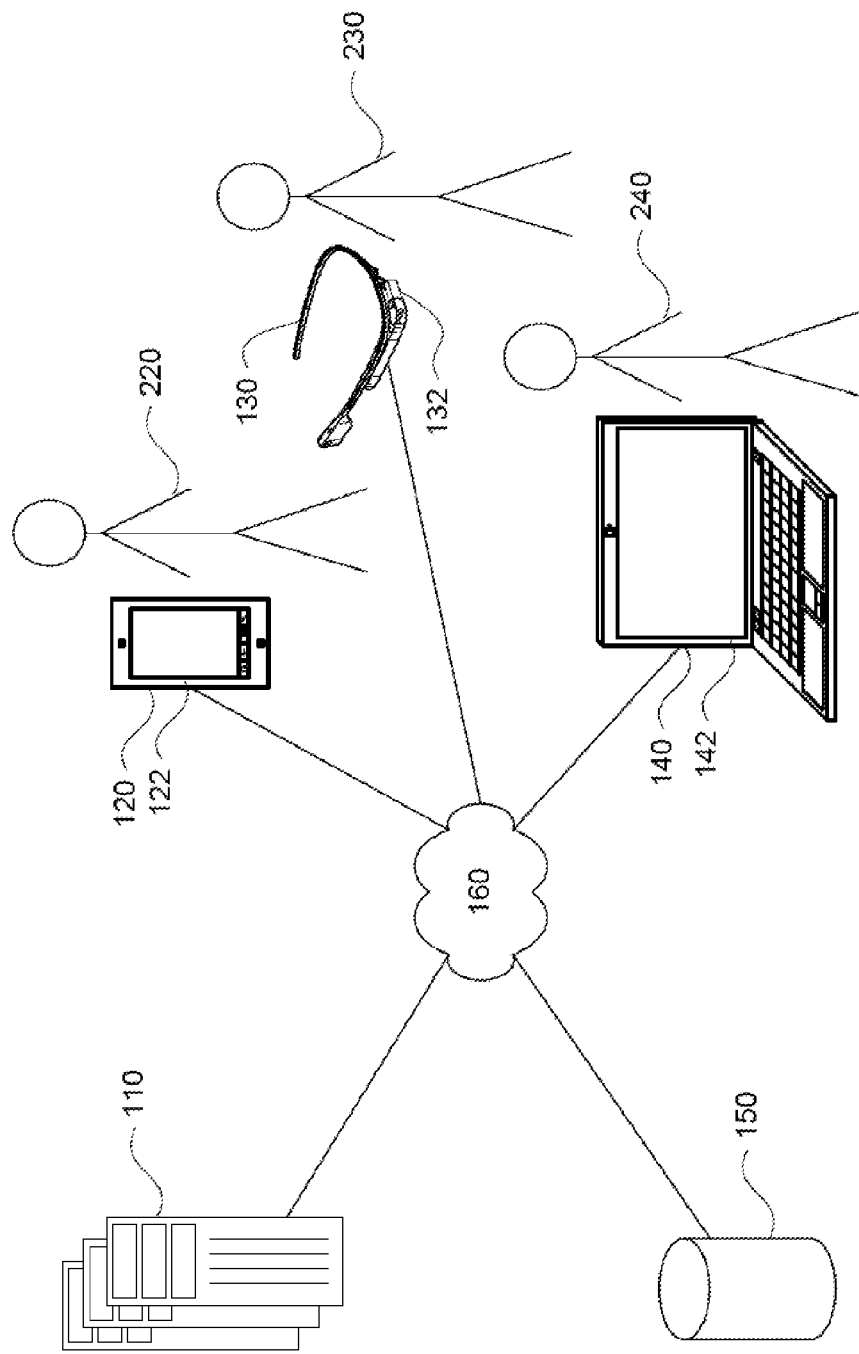
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each of computing devices 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Storage system 150 may store images and associated information such as image identifiers, orientation, location of the camera that captured the image, intrinsic camera settings (such as focal length, zoom, etc.), depth information, drag vectors, as well as references to other, target images. For example, each image may be associated with a depth map defining the 3D location of each pixel in real world coordinates, such as latitude, longitude and altitude or other such coordinates. This depth map may be generated as a 3D reconstruction of the image using the orientation, location, and intrinsic settings of the camera. In some examples, the depth map may be generated using Patch-based Multi-view Stereo Software ("PMVS").

In addition to the depth information, storage system 150 may also store drag vectors and references or associations between images as noted above. As described in more detail below, an image may be associated with a plurality of drag vectors. These drag vectors may have an origin starting at a pixel of the reference image and an orientation relative to the reference image.

Each of these drag vectors may also be associated with references to target images. In this regard, a computing device, such as one or more of server computing devices 110, may retrieve a target image based on information including an identifier of a reference image and a drag vector relative to that reference image. In some examples, the target images may also be considered reference images in that a given target image may also be associated with drag vectors relative to the given target image, and these drag vectors further associated with other target images.

Example Methods

As an example, a client computing device may provide users with an image navigation experience. In this example, the client computing device may communicate with one or more server computing devices in order to retrieve and display images. In this regard, a user may image a reference image received from one or more server computing devices on a display of a client computing device. FIG. 3 is an example of client computing device 120 displaying a reference image 310 on display 122.

The user may navigate to other images from the reference image using a dragging input relative the reference image. As an example, the user may use a finger 320 on a touch screen of display 122, as shown in FIG. 3, and drag the finger 320 in the direction of arrow 330. Alternatively, other types of user inputs such as a mouse pointer or stylus may be used to indicate a dragging input.

As noted above, each image of the storage system 150 may be associated with a plurality of drag vectors of different directions and magnitudes. The drag vector may be considered the difference between the start and end points or pixels of the drag vector. In this regard, (50,10) may represent a drag vector where the user has dragged 50 pixels to the right and 10 pixels upwards relative to the reference image. Thus, each drag vector may define a direction and magnitude of dragging input.

FIG. 4 is an example of different drag vectors shown overlaid onto a representation of reference image 310. In this example, origin 410 is associated with a plurality of drag vectors 411-417 extending away from the origin. In FIG. 4, the origin is depicted as the center of the reference image 310. However, the actual starting point and ending point need not be considered for a particular drag vector, only the direction and magnitude are relevant. In addition, although the drag vectors 411-417 are not depicted as evenly spaced, drag vectors may also be pre-organized at specific radial distances from one another. As an example, drag vectors for a particular reference image may be organized every 30 degrees (as between drag vectors 412 and 414) such that there is a set of direction vectors of different magnitudes for each of 0 degrees, 30 degrees, 90 degrees, 120 degrees, 150 degrees, 180 degrees, 210 degrees, 240 degrees, and 270 degrees. As a further example, the magnitudes may also have values ranging from a small number of pixels to a larger number of pixels, for example, depending on the number of pixels of the reference image. In addition, more or less drag vectors may also be used. For clarity, the drag vectors have the same magnitude, but the drag vectors may also have different magnitudes.

Thus, in one example, before providing target images to the client computing devices, one or more server computing devices may select a target image for each of the associated drag vectors of a reference image. Thus, for each of the drag vectors 411-417, and any others that may be associated with the reference image, the one or more server computing devices 110 may select a target image.

Figure 5:
FIG. 5 is example an image and image data in accordance with aspects of the disclosure.

In order to select a target image, one or more server computing devices may also identify a set of potential target images for the reference image. This set of potential target images may be identified based on the location, and in some examples, orientation information of the potential target images. FIG. 5 is an example of reference image 310 as well as a set of potential target images 510 and 520. In this example, each of potential target images 510 and 520 were captured at a location proximate to the location where the reference image 310 was captured.

For each drag vector of the reference image, the one or more server computing devices may determine a plurality of cost functions, one for each potential target image of the set of potential target images. Each cost function may include various cost terms arranged as a linear equation, a weighted sum, a nonlinear equation, an exponential equation, etc. These cost terms may be related to the flow fields, translational and rotational, between the reference image and the target image.

Figure 6:
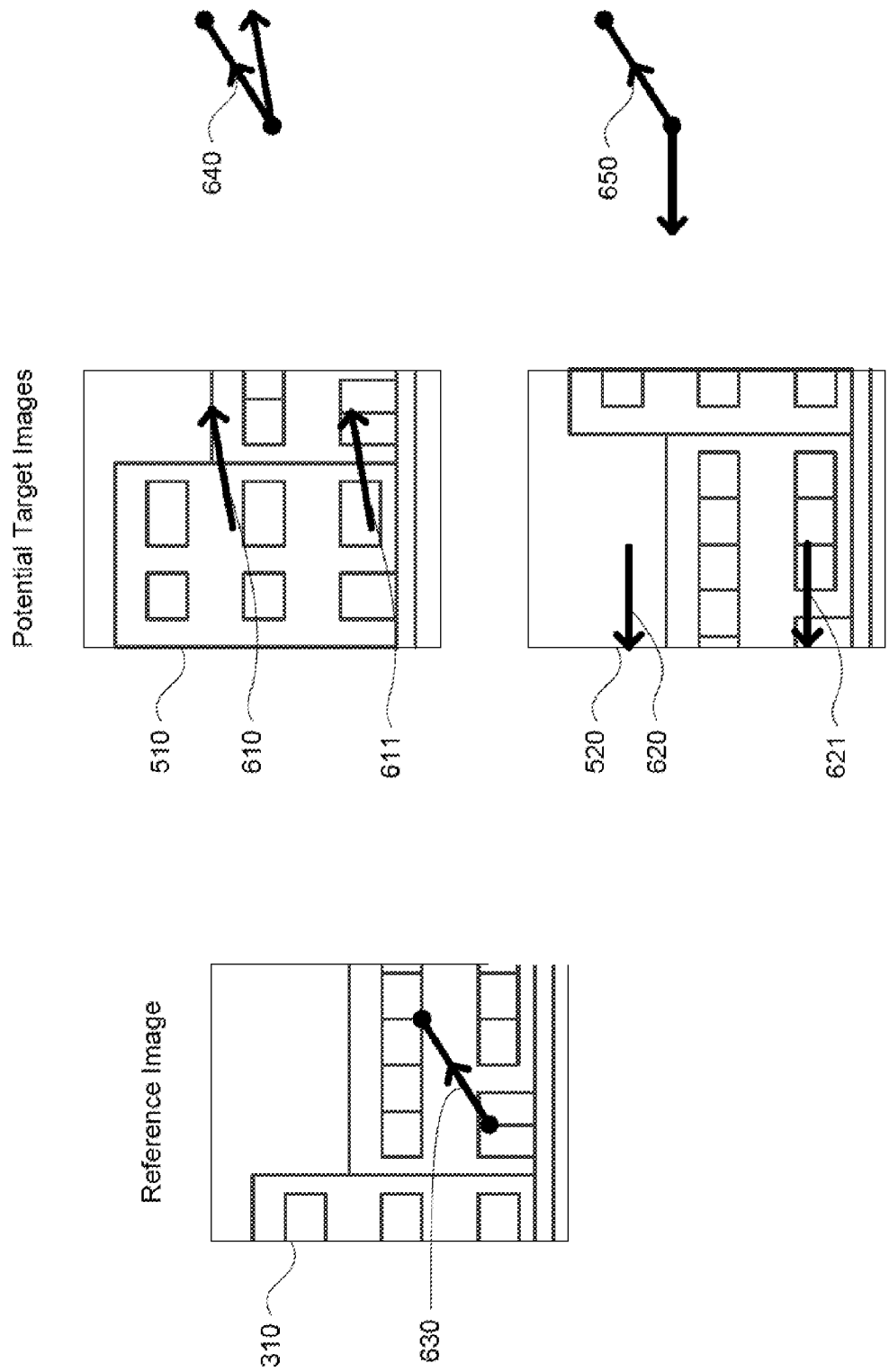
FIG. 6 is another example of images in accordance with aspects of the disclosure.

FIG. 6 is an example of flow fields (translational component only for simplicity) between reference image 310 and potential target images 510 and 520. In this example, vectors 610 and 611 define the flow field from potential target image 510 to reference image 310, or how the points of the potential target image 510 would move or flow into the reference image 310. In this example, vectors 620 and 621 define the flow field from potential target image 520 to reference image 310, or how the points of the potential target image 520 would move or flow into the reference image 310. If vector 630 represents a drag vector on the reference image, example 640 is a simplified comparison of the flow field and drag vector for potential target image 510, and example 650 is a simplified comparison of the flow field and drag vector for target image 520.

As an example, the cost function may be optimized to select target images according to one or more of: a drag flow cost, a rotation cost, an opposite rotation cost, a non-rotation cost, a translation cost, an opposite translation cost, and a non-translation cost. The potential target image of the set of potential target images which minimizes this cost function may be selected as the target image. In this case, the cost terms may be selected to be minimized based on the expectation of a better user experience. The examples herein relate to minimizing the cost function. However, as an alternative, the cost terms may be selected to be maximized based on the expectation of a better user experience. In this regard, the potential target image of the set of potential target images which maximize this cost function may be selected as the target image.

Figure 7:
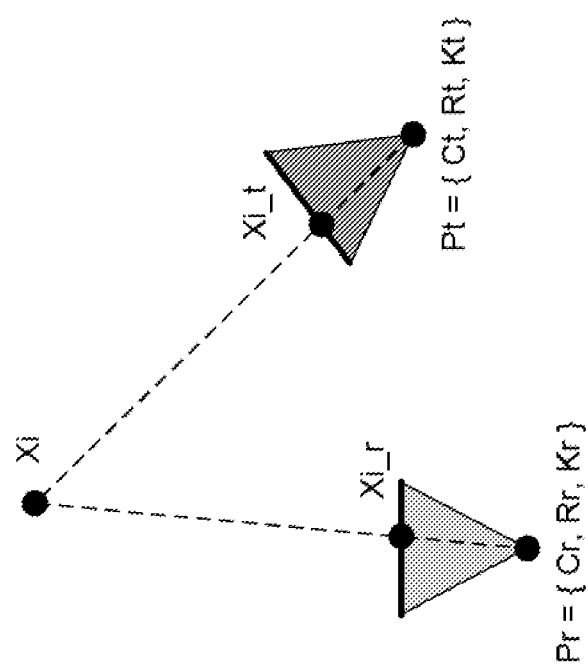
FIG. 7 is an example diagram of data in accordance with aspects of the disclosure.

FIG. 7 is an example diagram that will be used to demonstrate some of the cost terms mentioned above. In this example, Pr may represent the camera that captured the reference image and Pt may represent the camera that captured a potential target image of the set of potential target images. These cameras may be defined by the camera's center "C", rotation "R", and intrinsic camera parameters "K" (such as zoom, focal length, etc.). Each respective camera's center and rotation may define that camera's position and orientation in the world, while the intrinsic parameters may define how points in the camera's coordinate system are mapped to pixels of the image captured by that camera. Thus, Pr, the "reference" camera, may be defined by the parameters Cr, Rr, and Kr. Similarly, Pt, the "target" camera, may be defined by the parameters Ct, Rt, and Kt.

In this example, "Xi" may represent a 3D point. Its projection into the reference image may be $Xi\_r = p(Pr, Xi)$. In this example, p is a projection function. If the cameras are linear perspective projections, a reasonable model for most cameras, then Kr and Rr may be 3×3 matrices and Cr may be a 3 dimensional vector. Thus, p can be defined as $[m\_1/m\_3, m\_2/m\_3]$, where $m = Kr\, Rr\, (Xi - Cr)$. The difference between Xi_r and Xi_t is a flow vector which may describe how an observed point "moves" in the view port of a camera between the reference image and a potential target image. In this regard, a flow field may be defined by the collection of flow vectors for any points Xi which are on the observed (reconstructed) scene surface. For efficiency, the one or more server computing devices may limit the number of pixels considered to a predetermined value, such as 1000 pixels uniformly distributed in their projection in the reference view.

Figure 8:
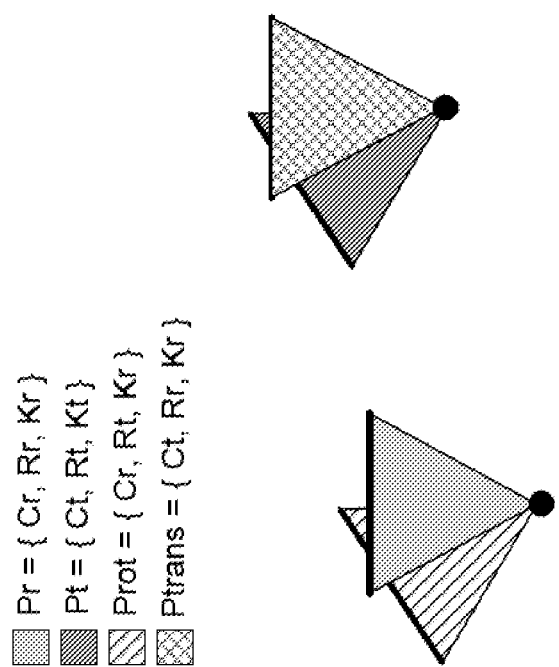
FIG. 8 is another example diagram of data in accordance with aspects of the disclosure.

The examples of FIGS. 7 and 8 also separate the amount of flow due to different types of motion, namely the rotation (rot) and translation (trans) of the cameras. In this example, Prot is a camera identical to Pr (the same translation and intrinsic camera settings), except that it has been rotated to match the orientation of Pt. Similarly, Ptrans is identical to Pr (the same rotation and intrinsic camera settings), except that it has been translation to match the position of Pt. Using these examples, several flow fields may be defined: the actual observed flow between reference and target or $m\_flow(i) = \{p(Pr, Xi)\, p(Pt, Xi)\}$; the flow due rotation only or $m\_rot(i) = \{p(Pr, Xi)\, p(Prot, Xi)\}$; and the flow due to translation only or $m\_trans(i) = \{p(Pr, Xi)\, p(Ptrans, Xi)\}$.

As noted above, various cost terms may be defined in terms of the flow fields. As an example, if "d" is a drag vector, a drag flow cost may be represented by: $c\_flow(i) = \|m\_flow(i) - d\|$. Thus, this cost term may be minimized when the actual observed flow between the reference image and the potential target image is equal to the drag vector. Similarly, a rotation cost may be represented by: $c\_rot(i) = \|m\_rot(i) - d\|$. This cost term may be minimized when the flow due to rotation is equal to the drag vector. An opposite rotation cost may be represented by: $c\_op\_rot(i) = \|m\_rot(i) + d\|$. This flow term may be minimized when the flow due to rotation is opposite of the drag vector. A non-rotation cost may be represented by $c\_no\_rot(i) = \|m\_rot(i)\|$. This cost term may be minimized when the flow due to rotation is zero. A translation cost term may be represented by $c\_trans(i) = \|m\_trans(i) - d\|$. This cost term may be minimized when the flow due to translation is equal to the drag vector. An opposite translation cost may be represented by $c\_op\_trans(i) = \|m\_trans(i) + d\|$. This cost term may be minimized when the flow due to translation is opposite of the drag vector. A non-translation cost term may be represented by c_no_trans(i)=‖m_trans(i)‖. This cost term may be minimized when the flow due to translation is zero.

Other cost terms which are not based on flow, such as an overlap cost, may also be used. Overlap may be defined as the percentage of pixels which are visible between two images. Thus, if the potential target image that minimizes the cost function will be selected as the target image for that pixel, the overlap cost term may be minimized when the reference image and the target image completely overlap. In other words, the target image should overlap with the reference image as much as possible.

Figure 9:
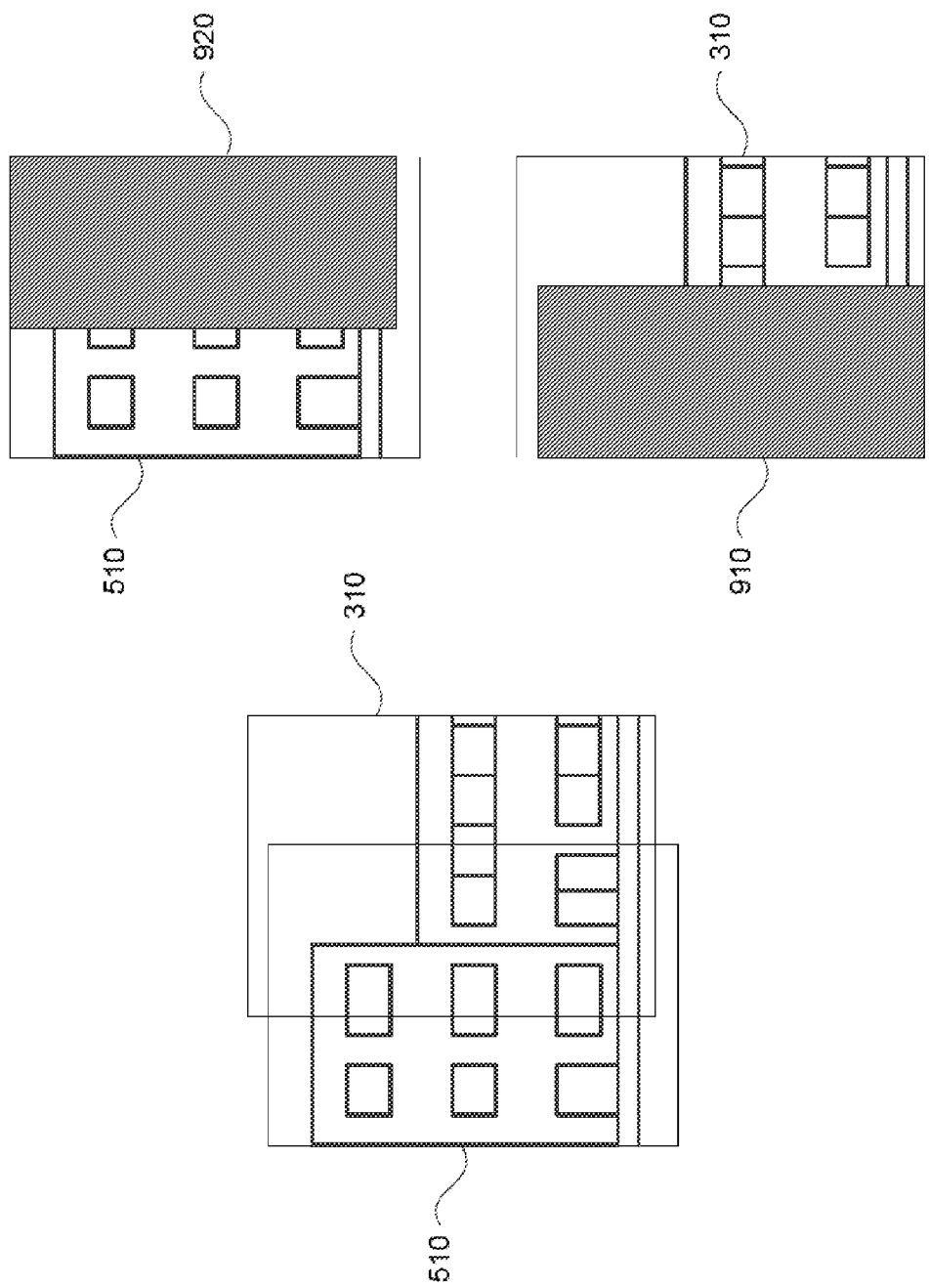
FIG. 9 is an example of image overlap data in accordance with aspects of the disclosure.

FIG. 9 is an example of a reference image 310 and target image 510. Area 910 of reference image 310 demonstrates the region of overlap between the target image 510 and the reference image. Area 920 of target image 510 demonstrates the region of overlap between the reference image 310 and the target image. Thus, overlap can be based on both as the number of pixels of the reference image that project into the target image (within the image boundaries) as well as the number of pixels in the target image which are projected into the reference image. The former measures how much of the reference image are within (or seen by) the target image, and the latter measures how much of the target image is covered by the reference image. An example equation for the overlap cost term may be: c_overlap=(1−#_of_pixels_within/#_of_pixels_Reference)+(1−#_of_pixels_covered/#_of_pixels_Target). Thus, in this example, each of these two terms of the overlap cost term may range from 0 to 1.

As most images may contain many different objects at different depths and there may be a limited set of target images to choose from, not all pixels of the potential target images would be expected to exhibit flow that matches the above expectations. In some examples, for a "good" target image, many of the pixels may have flow that matches the drag vector, but some percentage may have a very different flow. For this reason, the cost function may be defined as robust to some percentage of outlier points. To accomplish this, a quartile function may be used to determine the average score of each flow field. As an example, given a set of values si={s1, . . . , sn}, a quartile function may be represented by: q({s1, . . . , sn}, k)=min(m) such that k>count (si<m)/count (si). As an example, if k is 0.66 (66%), then q(c_flow(i), 0.66) will return smallest value m in c_flow(i) such that 66% of the c_flow(i) are less than m. Other larger or smaller values of k may also be used.

Using the example cost terms described above, if the cost function is arranged as a weighted sum, an example cost function for a particular drag vector of a reference image and a particular potential target image: C(Pr, Pt, Xi)=w_flow*q (c_flow(i), 0.66)+w_rot*q(c_rot(i), 0.66)+w_op_rot*q(c_op_rot(i), 0.66)+w_no_rot*q(c_no_rot(i), 0.66)+w_trans*q (c_trans(i), 0.66)+w_op_trans*q(c_op_trans(i), 0.66)+ w_no_trans*q(c_no_trans(i), 0.66)+w_c_overlap*(1− #_of_pixels_within/#_of_pixels_Reference)+(1− #_of_pixels_covered/#_of_pixels_Target). In this example, w_flow, w_rot, w_op_rot, w_no_rot, w_trans, w_op_trans, w_no_trans, w_c_overlap, may be a set of weights used to value each of the cost terms relative to the cost function.

The cost terms may also be tuned to prefer different motions. For example, when a user uses a user input device, such as a mouse or touch screen, to drag an image, the user may be provided with one of three different types of results: a pan or tilt, a slide, or an orbit.

FIG. 10 is a table of example weights that may be used with the above equation to achieve different motion results. In this example, the difference between orbit (cw) and orbit (ccw) depends on the arbitrary choice of whether dragging an image to the right should cause a clockwise or counterclockwise orbit. In addition, the values 1 or 0 may be appropriate weights. However, the values of 1 may alternatively be placeholders for some positive value. The exact positive values may depend upon how sensitive each motion should be to the drag action.

In the pan/tilt example, the drag flow may be expected to match the drag vector, and the translation flow may be expected to match the zero vector. In the slide example, both the drag flow and the translation flow may be expected to match the drag vector. And, in the orbit example, the flow close to the center of the image may be expected to match the zero vector. As the overlap cost is not related to flow, this value may not affect the motion.

The cost functions for each target image of the set of target images may be determined for each particular motion type and drag vector. The potential target image of the set of potential target images having the lowest cost value may be selected as the target image for that particular combination of motion type and drag vector. Accordingly, selected target image for each of the different drag vectors and motion types may be associated with the reference image. FIG. 11 is an example of the target image data for reference image 1. In this example, a drag vector, drag vector 1 is associated with a target image for each of the pan, slide and orbit motions. This data may be stored, for example, in storage system 150.

Figure 12:
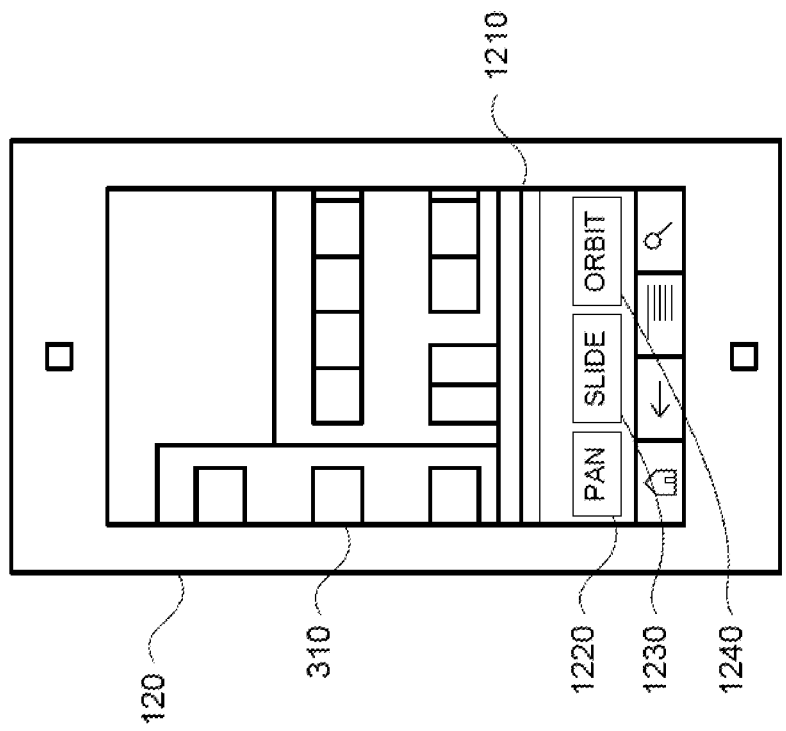
FIG. 12 is another example screen shot on a client computing device in accordance with aspects of the disclosure.

As noted above, the target image data may be used to provide target images to users in response to a dragging input on a reference image. In one example, before a user drags the reference image, the user may select a particular result type. FIG. 12 is an example of client device 120 and screen shot 1210 demonstrating how a user can select between different results by selecting one of buttons 1220, 1230, or 1240. Other selection methods may also be used. The result type selected by the user may be used to retrieve a target image in response to a dragging input.

Figure 13:
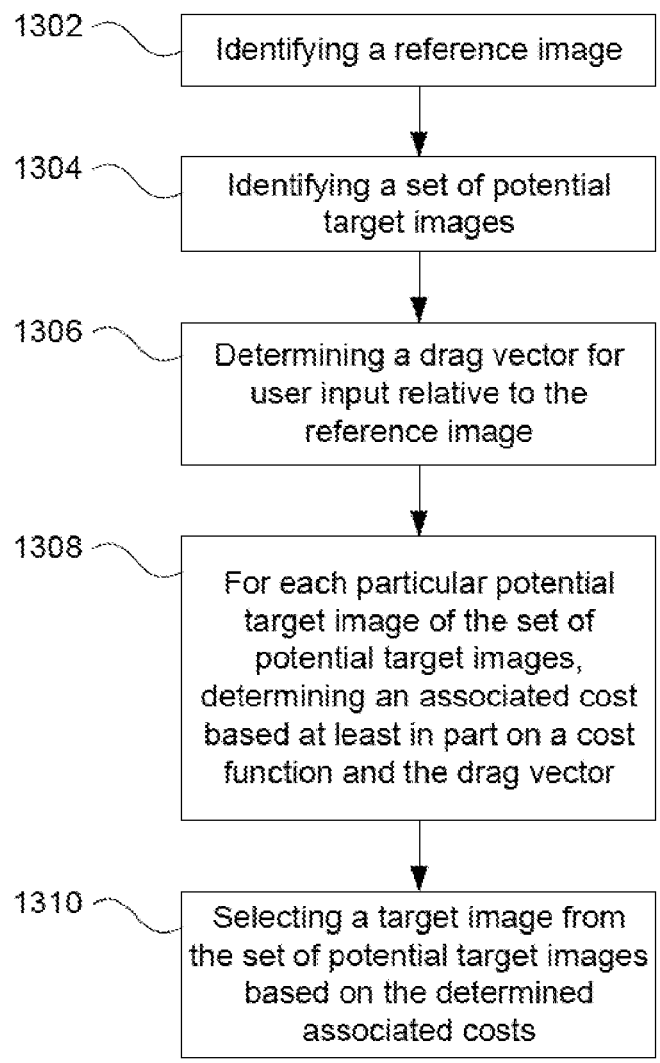
FIG. 13 is a flow diagram in accordance with aspects of the disclosure.

FIG. 13 is an example flow diagram 1300 of some of the aspects described above which may be performed by one or more server computing devices, such as server computing devices 110. In this example, the one or more computing devices identify a reference image at block 1302. The one or more server computing devices may also identify a set of potential target images for the identified reference image at block 1304. The one or more server computing devices may also determine a drag vector for user input relative to the reference image at block 1306. For each particular potential target image of the set of potential target images, an associated cost based at least in part on a cost function and the drag vector is determined at block 1308. This associated cost may represent a cost of transitioning between the reference image and the target image. The one or more server computing devices may select a target image from the set of potential target images based on the associated costs at block 1310.

Figure 14:
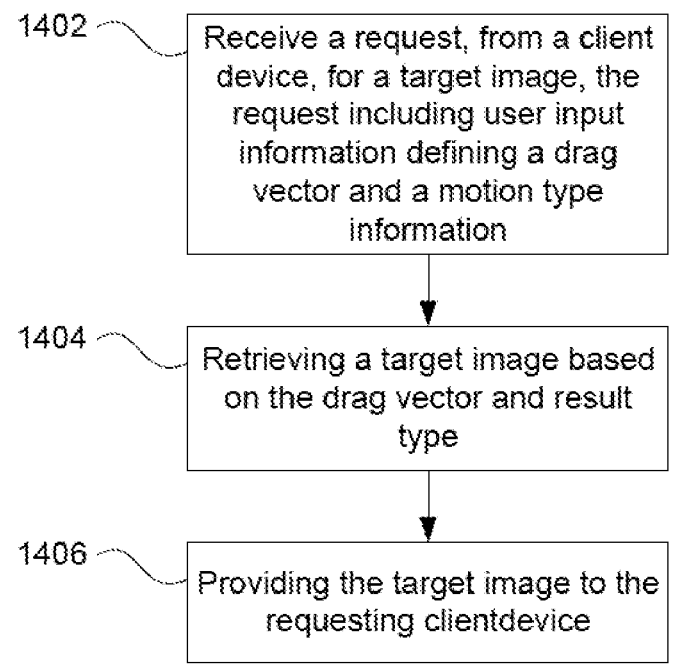
FIG. 14 is another flow diagram in accordance with aspects of the disclosure.

FIG. 14 is an example flow diagram 1400 of additional the aspects described above which may be performed by one or more server computing devices, such as server computing devices 110. In this example, the one or more server computing devices receive a request from a client computing device for a target image. The request includes user input information identifying a drag vector relative to the reference image as well as motion type information, for example, identifying a panning, sliding or orbiting motion. The one or more server computing devices retrieve a target image based on the drag vector of the user input at block 1404. The one or more server computing devices then provide the target image to the requesting client device for display to a user at block 1406.

This process may repeat as the user of the client computing device drags a displayed target image, and the one or more server computing devices provide additional target images to the requesting client device for display to the user.

As an alternative, rather than being computed and stored in storage system 150 before being provided to client computing devices, a target image for a particular drag vector and motion combination of reference image may be computed in real time by one or more server computing devices in response to a request for a target image from a client computing device or by a client computing device in response to receiving the user dragging input.

In addition, rather than sending a request in response to receiving user dragging input, the client computing device may retrieve the target image from local memory of the client computing device. For example, when the server computing device provides the reference image to the client device, the one or more server computing devices may send one or more target images with the reference image. In another example, if all of the reference and target images are stored locally at the client device, the client device may simply retrieve the needed images from the local storage.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
identifying, by one or more computing devices, a reference image;
identifying, by the one or more computing devices, a set of potential target images for the reference image;
determining, by the one or more computing devices, a drag vector for user input relative to the reference image;
after the drag vector is determined, for each particular potential target image of the set of potential target images, determining, by the one or more computing devices, an associated cost based at least in part on a cost function and the drag vector; and
selecting, by the one or more computing devices, a target image from the set of potential target images based on the determined associated costs.

2. The method of claim 1, further comprising providing the selected target image for display to a user.

3. The method of claim 1, wherein the cost function is determined as a weighted sum of one or more cost terms.

4. The method of claim 1, wherein selecting the target image includes selecting the particular potential target image of the set of potential target images having a lowest-valued associated cost.

5. The method of claim 1, wherein:
determining the associated cost for each particular potential target image of the set of potential target images includes determining a drag flow cost term between the reference image and that particular potential target image; and
the drag flow cost term is configured to be minimized when an observed flow of points of the reference image to that particular potential target image is equal to the drag vector.

6. The method of claim 1, wherein:
determining the associated cost for each particular target image of the set of potential target images includes determining a rotation cost term between the reference image and that particular potential target image; and
the rotation cost term is configured to be minimized when a rotation component of an observed flow of points of the reference image to that particular potential target image is equal to the drag vector.

7. The method of claim 1, wherein:
determining the associated cost for each particular potential target image of the set of potential target images includes determining a rotation cost term between the reference image and that particular potential target image; and
the rotation cost term is configured to be minimized when a rotation component of an observed flow of points of the reference image to that particular potential target image is opposite of the drag vector.

8. The method of claim 1, wherein:
determining the associated cost for each particular potential target image of the set of potential target images includes determining a rotation cost term between the reference image and that particular potential target image; and
the rotation cost term is configured to be minimized when a rotation component of an observed flow of points of the reference image to that particular potential target image is zero.

9. The method of claim 1, wherein:
determining the associated cost for each particular potential target image of the set of potential target images includes determining a translation cost term between the reference image and that particular potential target image; and
the translation cost term is configured to be minimized when a translation component of an observed flow of points of the reference image to that particular potential target image is equal to the drag vector.

10. The method of claim 1, wherein:
determining the associated cost for each particular potential target image of the set of potential target images includes determining a translation cost term between the reference image and that particular potential target image; and
the drag flow cost term is configured to be minimized when a translation component of an observed flow of points of the reference image to that particular potential target image is opposite of the drag vector.

11. The method of claim 1, wherein:
determining associated cost for each particular potential target image of the set of potential target images includes determining a translation cost term between the reference image and that particular potential target image; and the drag flow cost term is configured to be minimized when a translation component of an observed flow of points of the reference image to that particular potential target image is zero.

12. The method of claim 1, wherein determining the associated cost for each particular potential target image of the set of target images includes determining an overlap cost term based on an amount of overlap of points between the reference image and that particular potential target image.

13. The method of claim 1, wherein:
determining the associated cost further includes determining weights for one or more terms of the cost function based on a particular motion result; and
the motion result is selected from the group consisting of a panning motion, a sliding motion, and an orbiting motion.

14. The method of claim 1, further comprising:
receiving, from a client computing device, a request for a target image, the request identifying the drag vector and the reference image;
retrieving the selected target image based on the association with the drag vector and the reference image; and
providing the selected target image to the client computing device.

15. A system comprising one or more computing devices configured to:
identify a reference image;
identify a set of potential target images for the reference image;
determine a drag vector for user input relative to the reference image;
after the drag vector is determined, for each particular potential target image of the set of potential target images, determine an associated cost based at least in part on a cost function and the drag vector; and
select a target image based on the determined associated costs.

16. The system of claim 15, wherein the one or more computing devices are configured to determine the cost functions as weighted sum of one or more cost terms.

17. The system of claim 15, wherein the one or more computing devices are further configured to select the target image by selecting the particular potential target image of the set of potential target images having a lowest-valued associated cost.

18. The system of claim 15, wherein the one or more computing devices are configured to provide the selected target image for display to a user.

19. The system of claim 15, wherein the one or more computing devices are configured to:
receive, from a client computing device, a request for a target image, the request identifying the drag vector and the reference image;
retrieve the selected target image based on the association with the drag vector and the reference image; and
provide the selected target image to the client computing device.

20. A non-transitory, computer-readable storage device on which computer readable instructions of a program are stored, the instructions, when executed by one or more processors, cause the one or more processors to perform a method, the method comprising:
identifying a reference image;
identifying a set of potential target images for the reference image;
determining a drag vector for user input relative to the reference image;
after the drag vector is determined, for each particular potential target image of the set of potential target images, determining, by the one or more computing devices, an associated cost based at least in part on a cost function and the drag vector; and
selecting a target image from the set of potential target images based on the determined associated costs.

* * * * *